US007987729B2

(12) United States Patent
Sugahara

(10) Patent No.: US 7,987,729 B2
(45) Date of Patent: Aug. 2, 2011

(54) ATTACHABLE MEMBER, ATTACHING MECHANISM, AND PRINTER

(75) Inventor: Hiroto Sugahara, Aichi-ken (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 187 days.

(21) Appl. No.: 12/412,302

(22) Filed: Mar. 26, 2009

(65) Prior Publication Data
US 2009/0241695 A1    Oct. 1, 2009

(30) Foreign Application Priority Data

Mar. 28, 2008    (JP) .................... 2008-087726

(51) Int. Cl.
*G01L 3/00*    (2006.01)
(52) U.S. Cl. ........................... 73/800; 73/760
(58) Field of Classification Search ............ 73/760, 73/800
See application file for complete search history.

(56) References Cited

U.S. PATENT DOCUMENTS

| 5,761,566 | A | 6/1998 | Suzuki et al. | |
|---|---|---|---|---|
| 6,159,394 | A | 12/2000 | Akiyama et al. | |
| 6,280,655 | B1 | 8/2001 | Xu et al. | |
| 6,678,491 | B2 * | 1/2004 | Kido et al. | 399/128 |
| 6,823,153 | B2 * | 11/2004 | Ueno et al. | 399/103 |
| 6,859,629 | B2 * | 2/2005 | Miura et al. | 399/64 |
| 7,044,590 | B2 | 5/2006 | Fujikawa et al. | |
| 7,261,403 | B2 | 8/2007 | Fujikawa et al. | |
| 2007/0040884 | A1 * | 2/2007 | Shoki | 347/101 |
| 2008/0007603 | A1 | 1/2008 | Fujikawa et al. | |
| 2009/0214230 | A1 * | 8/2009 | Kweon et al. | 399/27 |
| 2009/0244166 | A1 * | 10/2009 | Sugahara | 347/19 |

FOREIGN PATENT DOCUMENTS

| JP | H09-185311 | A | 7/1997 |
|---|---|---|---|
| JP | 2000-063824 | A | 2/2000 |
| JP | 2001-049251 | A | 2/2001 |
| JP | 2001-064638 | A | 3/2001 |
| JP | 2004-001480 | A | 1/2004 |
| JP | 2006-116778 | A | 5/2006 |
| JP | 2006-269118 | A | 10/2006 |
| JP | 2006-275813 | A | 10/2006 |
| JP | 2007-101278 | A | 4/2007 |

OTHER PUBLICATIONS

Japan Patent Office, Notice of Reasons for Rejection for Application No. JP2008-087726, mailed Jun. 22, 2010. (Counterpart to above-captioned U.S. patent application; partial translation).

* cited by examiner

*Primary Examiner* — Max Noori
(74) *Attorney, Agent, or Firm* — Baker Botts L.L.P.

(57) ABSTRACT

An ink cartridge, which is releasably installed to a cartridge-installing section, includes a contact section which is brought into contact with the cartridge-installing section when the ink cartridge is installed to the cartridge-installing section, a stress light-emitting section which is provided with the contact section and which emits light by receiving a force when the contact section is brought into contact with the cartridge-installing section, and a light-receiving sensor which receives the light emitted by the stress light-emitting section and which generates a detection signal to indicate detection that the ink cartridge is installed. Accordingly, an attaching mechanism is provided, which is capable of detecting whether or not the ink cartridge is installed appropriately.

17 Claims, 11 Drawing Sheets

ATTACHABLE MEMBER, ATTACHING MECHANISM, AND PRINTER

CROSS REFERENCE TO RELATED APPLICATION

The present application claims priority from Japanese Patent Application No. 2008-087726, filed on Mar. 28, 2008, the disclosure of which is incorporated herein by reference in its entirety.

BACKGROUND OF THE INVENTION

1. Field of the Invention

The present invention relates to an attachable member to be detachably installed, for example, to main body of various electric, electronic, and mechanical devices or apparatuses, an attaching mechanism, and a printer provided with the attaching mechanism.

2. Description of the Related Art

Conventionally, an ink cartridge-detecting mechanism is known, which is capable of detecting whether or not an ink cartridge is installed, by means of a reflection type optical sensor (see, for example, U.S. Pat. No. 7,044,590 B2, U.S. Pat. No. 7,261,403 B2, and U.S. 2008/0007603 A1 corresponding to Japanese Patent Application Laid-open No. 2004-1480).

In the case of this ink cartridge-detecting mechanism, when the ink cartridge is not installed, the light, which is emitted from a light-emitting section of the optical sensor, is received by a light-receiving section. Accordingly, it is possible to detect or sense that the ink cartridge is not installed. When the ink cartridge is installed, then the light, which is emitted from the light-emitting section of the optical sensor, is shielded by a light-shielding section, and the light is not received by the light-receiving section. Accordingly, it is possible to detect or sense that the ink cartridge is installed. In this way, it is possible to detect whether or not the ink cartridge is installed by using the optical sensor.

SUMMARY OF THE INVENTION

However, in the case of the conventional ink cartridge-detecting mechanism described above, it is necessary to provide the light-shielding section and the optical sensor having both of the light-emitting section and the light-receiving section. Therefore, the structure is complicated, and the cost is expensive.

Further, for example, when the installing force, which is exerted when an operator installs the ink cartridge to a cartridge-installing section, is excessively large, the ink cartridge or the cartridge-installing section is damaged in some cases. In order to avoid this inconvenience, it is conceived that the magnitude of the installed force for installing the ink cartridge to the cartridge-installing section can be detected.

However, in the case of the conventional cartridge-detecting mechanism, it is impossible to detect the magnitude of the installing force for installing the ink cartridge to the cartridge-installing section. Therefore, it is necessary to individually provide any detecting device for detecting the installing force.

The present invention has been made in order to solve the problem as described above, an object of which is to provide an attachable member and an attaching mechanism having a simple structure, capable of detecting or displaying whether or not the attachable member such as an ink cartridge or a printing paper tray is normally installed to a main body, as well as an attachable member and an attaching mechanism having a simple structure, capable of detecting or displaying the magnitude of the installing force exerted by the attachable member on a main body.

According to a first aspect of the present invention, there is provided an attaching mechanism including:

an attachable member;

an installing section to which the attachable member is detachably installed;

a contact section which is provided on one of the installing section and the attachable member and which is brought into contact with the other of the installing section and the attachable member when the attachable member is installed to the installing section; and a stress light-emitting section which is provided on the contact section and which emits a light by receiving a force applied to the contact section when the contact section is brought into contact with the other of the installing section and the attachable member.

According to the first aspect of the present invention, when the attachable member is progressively installed to the installing section, then the contact section abuts against the installing section or the attachable member, and the stress is applied to the stress light-emitting section. The stress light-emitting section emits the light by applying the stress as described above. It is possible to display that the attachable member is installed to the installing section by emitting the light by the stress light-emitting section.

When the attaching mechanism of the present invention further include the light-receiving sensor, the light-receiving sensor can receive the light emitted by the stress light-emitting section, and the light-receiving sensor can generate the detection signal to detect or sense that the attachable member is installed. For example, the fact of the installation is displayed on a display section in accordance with the detection signal, and an operator can visually recognize the fact.

According to a second aspect of the present invention, there is provided a printer including the attaching mechanism according to the first aspect of the present invention.

According to a third aspect of the present invention, there is provided an attachable member which is detachably installed to a predetermined installing section, the attachable member including:

a body having a contact section which is brought into contact with the installing section when the attachable member is installed to the installing section, and a stress light-emitting section which is provided with the contact section and which emits a light by receiving a force applied to the contact section when the contact section is brought into contact with the installing section.

According to the third aspect of the present invention, the attachable member functions in the same manner as the attaching mechanism according to the present invention. The stress light-emitting section is provided for the attachable member, and hence the attachable member can be distinguished from any attachable member which is not provided with the stress light-emitting section. In other words, the attachable member, which is provided with the stress light-emitting section, has the stress light-emitting section which emits the light when the attachable member is installed to the installing section. However, any attachable member, which is not provided with the stress light-emitting section, does not emit any light even when such an attachable member is installed to the installing section. Therefore, it is possible to distinguish the both from each other.

According to the attaching mechanism concerning the present invention, the stress light-emitting section is provided, and the light-emitting function, which is brought about by the stress light-emitting section, requires no electric wiring. Therefore, the structure is simple, and it is possible to reduce the cost, as compared with a case in which any electric light-emitting section, which requires the electric wiring, is used.

The light-receiving sensor generates the detection signal corresponding to the light emission intensity of the light emitted by the stress light-emitting section. The judging mechanism can judge whether or not the detection signal is larger than the first threshold value as well. Therefore, it is possible to judge whether or not the attachable member is installed to the installing section at an appropriate strength, and it is possible to judge whether or not the attachable member is detached from the installing section at an appropriate strength. Accordingly, it is possible to allow the operator to recognize the appropriate strength when the installing member or the attachable member is attached or detached. It is possible to avoid the damage of the installing member or the installing section when the installing member is installed.

The attachable member according to the present invention provides the effect which is the same as or equivalent to that provided by the device or apparatus for detecting the attachable member, and the attachable member according to the present invention is provided with the stress light-emitting section. When any attachable member, which is not provided with the stress light-emitting section, is installed to the installing section, it is possible to inform, for example, the operator of the installation of such an attachable member.

BRIEF DESCRIPTION OF THE DRAWINGS

FIGS. 2A and 2B show vertical sectional views illustrating the attachable member and the device for detecting the attachable member according to the first embodiment, wherein FIG. 2A shows a vertical sectional view illustrating a state in which the attachable member is progressively inserted, and FIG. 2B shows a vertical sectional view illustrating a state in which the attachable member is installed.

FIGS. 9A to 9D show an attachable member according to a ninth embodiment of the present invention, wherein FIG. 9A shows a plan view illustrating the attachable member, FIG. 9B shows a side view illustrating the attachable member, FIG. 9C shows a sectional view taken along IXC-IXC illustrating the attachable member, and FIG. 9D shows a sectional view taken along IXD-IXD illustrating the attachable member.

FIGS. 10A and 10B show vertical sectional views illustrating the attachable member and a device for detecting the attachable member according to the ninth embodiment, wherein FIG. 10A shows a vertical sectional view illustrating a state in which the attachable member is progressively inserted, and FIG. 10B shows a vertical sectional view illustrating a state in which the attachable member is installed.

DESCRIPTION OF THE PREFERRED EMBODIMENTS

First Embodiment

Figure 1:
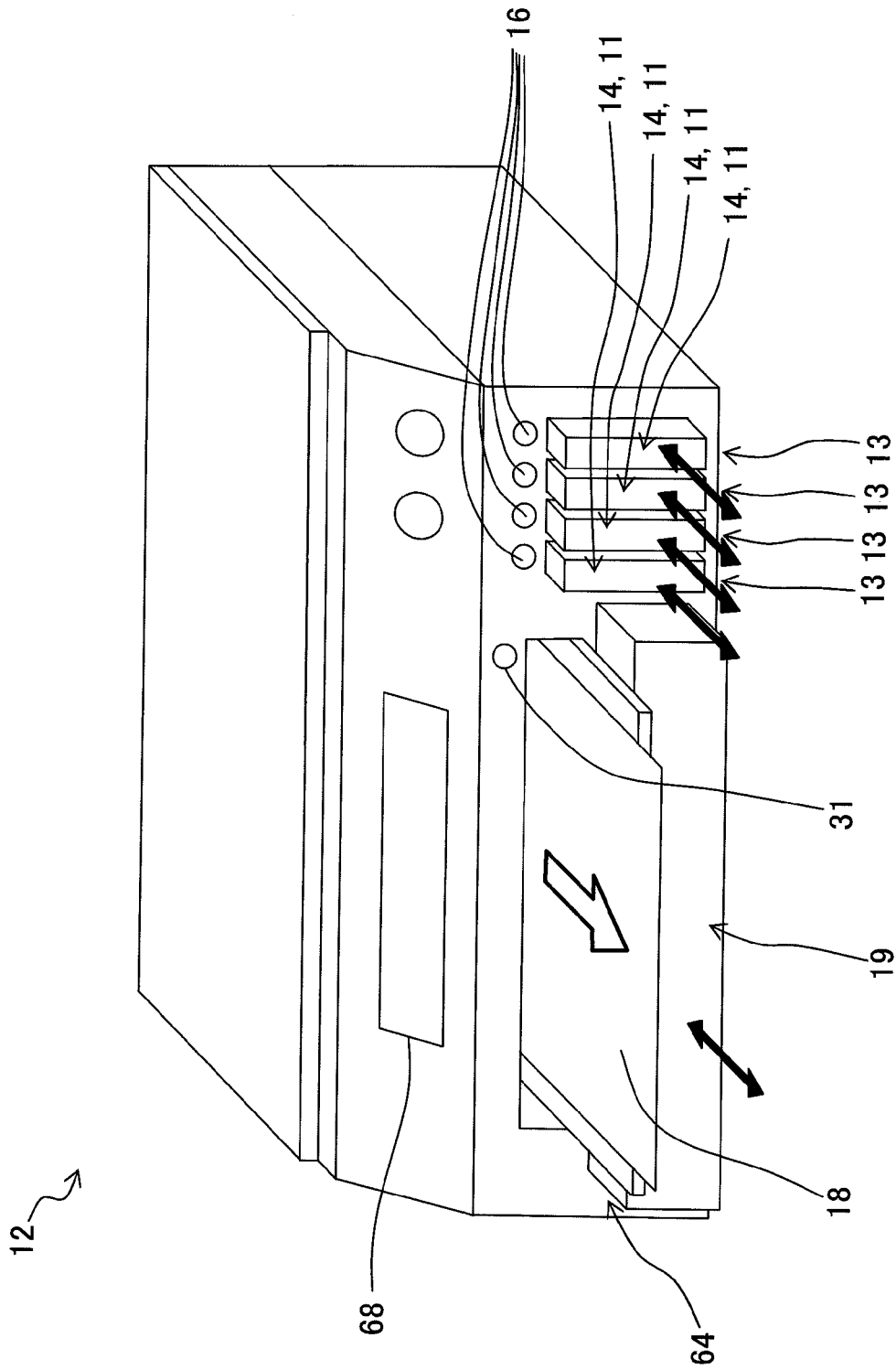
FIG. 1 shows a perspective view illustrating an ink-jet printer to which an attachable member and a device for detecting the attachable member according to a first embodiment of the present invention are applied.

An explanation will be made below with reference to FIGS. 1, 2, and 11 about a first embodiment of an attaching mechanism and an attachable member according to the present invention. As shown in FIG. 1, for example, the attaching mechanism 10 of this embodiment is applied to an ink-jet printer 12. The attaching mechanism 10, which is provided for the ink-jet printer 12, includes first to fourth ink cartridges (attachable members as liquid supply sources) 14 and first to fourth cartridge-installing sections (main body portions, installing sections) 13 to which the ink cartridges 14 are detachably installed. The attaching mechanism 10 includes detecting devices 11 which detect whether or not the first to fourth ink cartridges 14 are appropriately installed to the first to fourth cartridge-installing sections 13. Further, the detecting devices 11 have first to fourth light-receiving sensors 15 which detect whether or not the first to fourth cartridges 14 are installed to the first to fourth cartridge-installing sections 13, and first to fourth display sections 16 which are provided over or above the first to fourth cartridge-installing sections 13 and which display whether or not the first to fourth cartridges are normally installed. The first to fourth ink cartridges 14 are arranged in an order directed from the left side to the right side as shown in FIG. 1.

For example, when any one of the first to fourth display sections 16 is turned on, an operator can visually recognize that the ink cartridge 14, which corresponds to the concerning display section 16, is installed. When any one of the first to fourth display sections 16 is turned off, the operator can visually recognize that the ink cartridge 14, which corresponds to the concerning display section 16, is not correctly installed. Accordingly, it is possible to warn the operator to reinstall the ink cartridge 14 which is not installed correctly. Thus, it is possible to perform the printing.

Four inks of respective colors (black, cyan, magenta, and yellow) are stored in the four first to fourth ink cartridges 14 shown in FIG. 1 respectively. The inks, which are stored in the respective ink cartridges 14, are supplied to a head unit via four ink supply tubes 17 shown in FIG. 2B. One of the ink supply tubes 17 is shown in FIG. 2B. The inks, which are supplied to the head unit, are discharged from a large number of nozzle holes which are provided on the lower surface of the head unit. The inks are allowed to blow against a recording member such as the printing paper 18 to perform the printing. The sheets of the printing paper 18 to be used are stacked in a printing paper tray 19.

In this arrangement, any one of the first to fourth ink cartridges 14, any one of the first to fourth cartridge-installing sections 13, and any one of the first to fourth light-receiving sensors 15 are equivalent to one another. Therefore, the first ink cartridge 14, the first cartridge-installing section 13, and the first light-receiving sensor 15 will be explained with reference to FIGS. 2A and 2B by way of example. Any explanation will be omitted about the second to fourth ink cartridges 14, the second to fourth cartridge-installing sections 13, and the second to fourth light-receiving sensors 15.

Figure 2A:
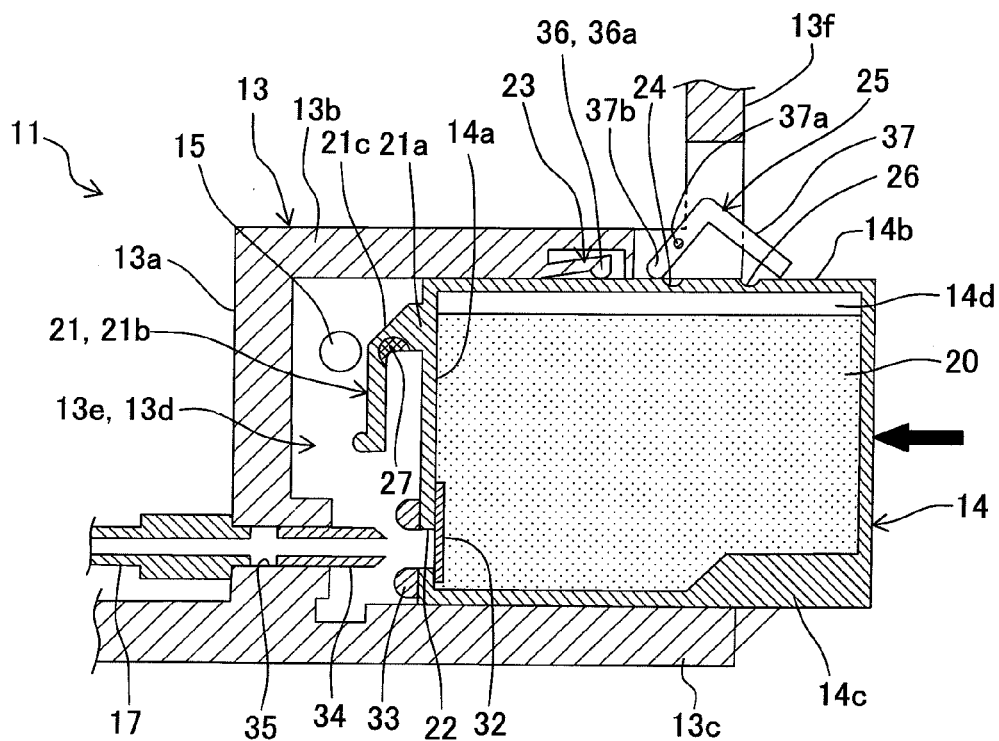
Figure 2B:
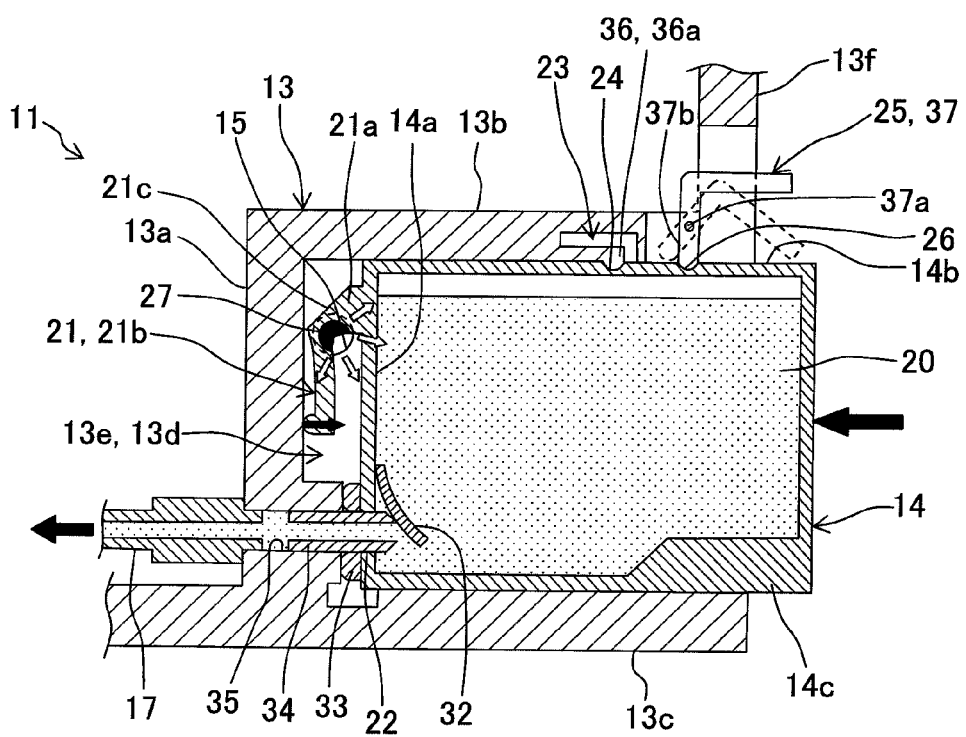

FIG. 2A shows a vertical sectional view illustrating a state in which the operator inserts the first ink cartridge 14 into the first cartridge-installing section 13 to move the first ink cartridge 14 to a position disposed in front of the installation position. FIG. 2B shows a vertical sectional view illustrating a state in which the operator has installed the first ink cartridge 14 to the first cartridge-installing section 13.

As shown in FIG. 2A, the first ink cartridge 14 is a case made of synthetic resin having a substantially rectangular parallelepiped shape with a height longer than a horizontal length in a front view. The black ink 20 is stored in a storage chamber provided therein. An contact section (contact section) 21 is provided at an upper portion of the outer surface of a back wall section 14a, and an ink supply port 22 is provided at a lower portion. A fastening recess (engaging recess) 24 and a disengaging recess 26 are provided on an upper wall section 14b. The fastening recess 24 is included in a fixing mechanism 23 which fastens the first ink cartridge 14 at the predetermined installation position in the first cartridge-installing section 13. The disengaging recess 26 is included in a disengaging mechanism 25 which is provided to detach or take out the first ink cartridge 14 installed to the first cartridge-installing section 13.

As shown in FIG. 2A, the contact section 21 is bent to have a substantially L-shaped form. The contact section 21 is provided with a base section (base section) 21a and a forward end section 21b, and the both sections are jointed to one another in a state of being perpendicular to one another. The base section 21a is joined to the upper portion of the outer surface of the back wall section 14a of the first ink cartridge 14. The base section 21a protrudes in the installing direction of the first ink cartridge 14. The forward end section 21b extends in the downward direction by a predetermined length from the base section 21a. The forward end section 21b is arranged in parallel to the back wall section 14a while allowing a spacing distance to intervene therebetween.

The contact section 21 realizes the deformation-enhancing structure (deformation facilitating structure) by means of the bent structure. In this arrangement, the forward-end section 21b extends in the predetermined extending direction from one end of the base section 21a. When the force, which is in the direction to intersect the extending direction, is exerted on the forward end section 21b, the forward end section 21b is deformed so that the forward end section 21b is flexibly bent or warped. Further, the stress, which is generated in the contact section 21 by the deformation, is concentrated on the L-shaped bent section (joined portion between the base section 21a and the forward end section 21b). The forward end section 21b extends in the longitudinal direction of the cross section, of the first ink cartridge 14, in the vertical plane perpendicular to the installing direction of the first ink cartridge 14 (rectangular cross section having a vertical length longer than a horizontal length). In other words, the forward end section 21b extends in the longitudinal direction of the cross section, in the vertical plane perpendicular to the installing direction, of an installation hole 13e to which the first ink cartridge 14 is installed.

As shown in FIG. 2A, a first stress light-emitting section 27 is provided at an inner portion of the bent section (stress-concentrating section) 21c formed for the substantially L-shaped contact section 21. The first stress light-emitting section 27 is formed of a material which emits the light when the stress is received as described later on.

As shown in FIG. 2B, the contact section 21 constitutes the deformation-enhancing structure. In other words, when the first ink cartridge 14 is installed to the first cartridge-installing section 13, the forward end section 21b of the contact section 21 abuts against the inner surface of the back wall section 13a of the first cartridge-installing section 13. In this situation, the contact section 21 can be greatly deformed by the force received by the abutment. The stress, which is generated in the contact section 21 by the deformation of the contact section 21, is concentrated on the bent section 21c formed with the first stress light-emitting section 27. Accordingly, the stress is applied to the first stress light-emitting section 27, and thus the light is emitted. Therefore, when the length and/or the thickness of the forward end section 21b of the contact section 21 is/are adjusted, the stress having a required magnitude or strength can be applied to the first stress light-emitting section 27. As a result, it is possible to emit the light at a required light emission intensity (luminance).

In particular, as for the first stress light-emitting section 27, the light emission intensity (luminance) is changed depending on the velocity of change of the stress applied when the forward end of the contact section 21 abuts against the inner surface of the back wall section 13a of the first cartridge-installing section 13. In the case of the first stress light-emitting section 27 as described above, when the operator installs the first ink cartridge 14 to the first cartridge-installing section 13 with a relatively large force, then the velocity of increase in the stress applied to the first stress light-emitting section 27 is relatively large, and the first stress light-emitting section 27 emits the light at a relatively large light emission intensity. On the other hand, when the operator installs the first ink cartridge 14 to the first cartridge-installing section 13 with a relatively small force, then the velocity of increase in the stress applied to the first stress light-emitting section 27 is relatively small, and the first stress light-emitting section 27 emits the light at a relatively small light emission intensity. The light, which is emitted by the first stress light-emitting section 27, is received by the first light-receiving sensor 15.

The first light-receiving sensor 15 is an optical sensor. The first light-receiving sensor 15 receives the light emitted by the first stress light-emitting section 27 to generate a detection signal corresponding to the light emission intensity of the light. For example, when the operator installs the first ink cartridge 14 to the first cartridge-installing section 13 at a relatively large force, the first stress light-emitting section 27 emits the light at a relatively large light emission intensity. The first light-receiving sensor 15, which receives the light, can generate a relatively large detection signal corresponding to the intensity of the light.

As shown in FIG. 2B, the first light-receiving sensor 15 is arranged at a position at which the light emitted by the first stress light-emitting section 27 provided for the contact section 21 can be received in the state in which the first ink cartridge 14 is installed to the first cartridge-installing section 13. Specifically, the first light-receiving sensor 15 is provided on one side wall section 13d of the cartridge-installing section 13. Although not shown, each of the second to fourth light-receiving sensors 15 is also provided on one side wall section 13d of each of the second to fourth cartridge-installing sections 13 in the same manner as described above. The first to fourth light-receiving sensors 15 are electrically connected to a control unit 28 provided for the ink-jet printer 12.

Figure 11:
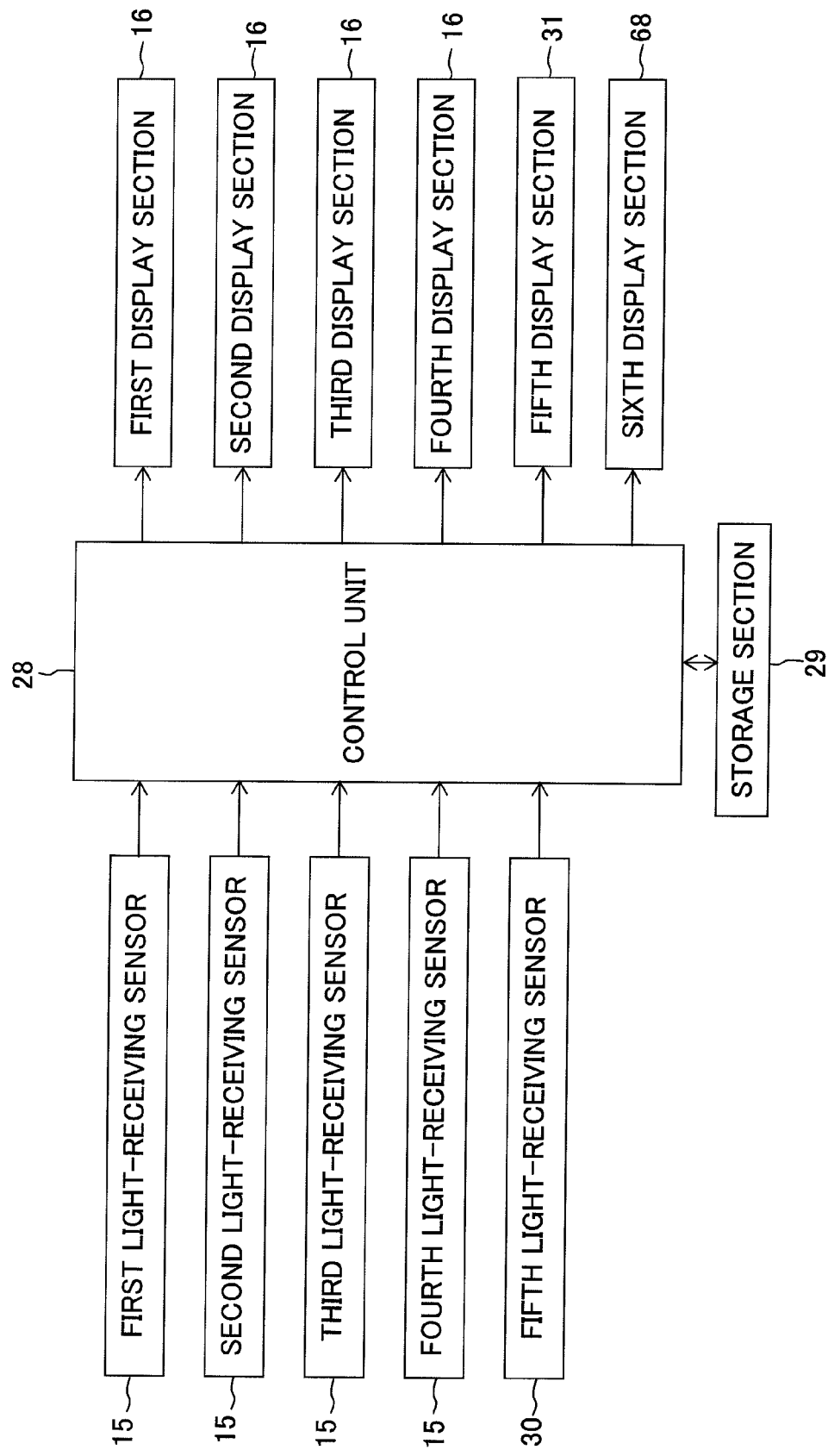
FIG. 11 shows a block diagram illustrating an electric circuit provided for the device for detecting the attachable member according to any one of the first to ninth embodiments of the present invention.

As shown in FIG. 11, the control unit (controller) 28 is composed of, for example, a central processing unit (CPU), and the control unit 28 includes a judging section. The first to fourth light-receiving sensors 15, the first to fourth display sections 16, and a storage section 29 are electrically connected to the control unit 28. The storage section 29 previously stores, for example, the control program for the ink-jet printer 12 and the contents to be displayed on the first to fourth display sections 16. A fifth light-receiving sensor 30 and a fifth display section 31 will be described later on.

Next, the judging section included in the control unit 28 will be explained. The judging section judges, for example, whether or not the forces, which are exerted when the first to fourth ink cartridges 14 are installed to the corresponding first to fourth cartridge-installing sections 13, are appropriate. Further, in this embodiment, various indications are displayed on the first to fourth display sections 16 on the basis of results of the judgment.

The first to fourth display sections 16 are turned on when the first to fourth ink cartridges 14 are appropriately installed to the corresponding first to fourth cartridge-installing sections 13.

The judging section judges to which rank the detection signal generated by each of the first to fourth light-receiving sensors 15 belongs, the rank being included in the first to fourth ranks classified by the first threshold value, the second threshold value, and the third threshold value. The setting is made such that the first threshold value has a value smaller than that of the second threshold value, and the second threshold value has the value smaller than that of the third threshold value.

The detection signal, which is not more than the first threshold value, falls under the first rank. The detection signal, which is larger than the first threshold value and which is not more than the second threshold value, falls under the second rank. The detection signal, which is larger than the second threshold value and which is not more than the third threshold value, falls under the third rank. The detection signal, which is larger than the third threshold value, falls under the fourth rank.

When the detection signal falls under the first rank, the judging section judges that the force, which is exerted during the installation of the ink cartridge 14 into the cartridge-installing section 13, is "excessively small". When the detection signal falls under the second rank, the judging section judges that the force, which is exerted during the installation of the ink cartridge 14 into the cartridge-installing section 13, is "appropriate". When the detection signal falls under the third rank, the judging section judges that the force, which is exerted during the installation of the ink cartridge 14, is "excessively large". When the detection signal falls under the fourth rank, the judging section judges that the force, which is exerted during the installation of the ink cartridge 14, is "abnormally excessively large".

When the judging section judges that the detection signal falls under the first rank, for example, the first display section 16, which is provided at the position over or above the concerning cartridge-installing section 13, is allowed to remain "turned off" without turning on the first display section 16 in order to indicate that the concerning ink cartridge 14 is in the installation failure. Accordingly, the operator can visually recognize that the pushing force is excessively small to cause the installation failure, and the operator can perform the installation again. Further, it is possible to prevent the operator from operating the ink-jet printer 12 while the ink cartridge 14 is in the installation failure.

When the judging section judges that the detection signal falls under the second rank, for example, the first display section 16, which is provided at the position over or above the concerning cartridge-installing section 13, is "turned on green or blue" in order to indicate that the concerning ink cartridge 14 is appropriately installed. Accordingly, the operator can visually recognize that the pushing force is appropriate, and the operator can recognize the appropriate magnitude or strength of the pushing force.

Further, when the judging section judges that the detection signal falls under the third rank, for example, the first display section 16, which is provided at the position over or above the concerning cartridge-installing section 13, is "turned on yellow". Accordingly, the operator can visually recognize that the pushing force is excessively large, and the operator can recognize that the pushing force should be a little more decreased at the next time and the followings.

When the judging section judges that the detection signal falls under the fourth rank, for example, the first display section 16, which is provided at the position over or above the concerning cartridge-installing section 13, is "turned on red". Accordingly, the operator can visually recognize that the pushing force is abnormally excessively large, and the operator can recognize that the attention should be paid to the pushing force at the next time and the followings. In this case, there is such a possibility that the ink cartridge 14 and/or the cartridge-installing section 13 may be damaged. Therefore, the control is made such that the ink-jet printer 12 is not operated. Further, in this case, a warning indication of, for example, "unusable, please contact the service center" is displayed on the sixth display section 68.

As described above, according to the detecting device 11 for the attachable member, the operator can recognize the appropriate pushing force to be adopted when the first to fourth ink cartridges 14 are installed to the first to fourth cartridge-installing sections 13. Further, when the first to fourth ink cartridges 14 are installed, it is possible to avoid any damage of the first to fourth ink cartridges 14 or the first to fourth cartridge-installing sections 13. When the first to fourth ink cartridges 14 are appropriately installed, the appropriate installation can be displayed on the first to fourth display sections 16.

In the detecting device 11 for the attachable member, when the operator detaches the first to fourth ink cartridges 14 from the first to fourth cartridge-installing sections 13, the first to fourth stress light-emitting sections 27 emit the light. The light can be detected by the first to fourth light-receiving sensors 15, and the first to fourth display sections 16, which correspond to the first to fourth ink cartridges 14 respectively, can be switched into the turn off state from the turn on state. Accordingly, the operator can visually recognize that the ink cartridge or cartridges 14 is/are detached.

Further, as shown in FIGS. 2A and 2B, the first to fourth ink cartridges 14 are provided with the first to fourth stress light-emitting sections 27. If an ink cartridge, which is not provided with the stress light-emitting section 27, is installed to the cartridge-installing section 13, the first to fourth display sections 16 are not turned on. Therefore, the turn off state can inform, for example, the operator of the fact that the ink cartridge, which is not provided with the stress light-emitting section 27, is installed. In this way, the ink cartridge 14, which is provided with the stress light-emitting section 27, can be distinguished from the ink cartridge which is not provided with the stress light-emitting section 27.

The first to fourth ink cartridges 14 shown in FIGS. 2A and 2B are provided with the first to fourth stress light-emitting sections 27 respectively. Any electric wiring is unnecessary for the light-emitting function brought about each of the first to fourth stress light-emitting sections 27. Therefore, the structure is simple, and it is possible to reduce the cost, as compared with a case in which any electric light-emitting section, which requires the electric wiring, is used.

As shown in FIG. 2B, the contact section 21 of this embodiment has the structure which is bent in the L-shaped form. In other words, the contact section 21 is formed so that the forward end section 21b extends in the downward direction (in the longitudinal direction of the cross section, of the first ink cartridge 14, in the plane perpendicular to the direction of installation of the first ink cartridge 14 or the cross section of the installation hole 13e to which the first ink cartridge 14 is installed). Therefore, it is possible to prolong the forward end section 21b of the contact section 21.

When the forward end section 21b of the contact section 21 is long, the large bending force is applied to the bent section 21c (stress-concentrating section) of the bent structure (deformation-enhancing structure) when the contact section 21 is brought into contact with the inner surface of the back wall section 13a of the first cartridge-installing section 13. The large bending force makes it possible to apply the large stress to the first stress light-emitting section 27. It is possible to increase the light emission intensity.

Next, the first to fourth stress light-emitting sections 27 will be explained. However, the first to fourth stress light-emitting sections 27 are equivalent to one another. Therefore, the first stress light-emitting section 27 will be explained, and the second to fourth stress light-emitting sections 27 will be omitted from the explanation.

The stress light-emitting material, which forms the first stress light-emitting section 27, is, for example, a substance obtained by adding europium (Eu) (rare earth substance) as the light emission center to a base material of $Sr_3Al_2O_6$ (aluminic acid salt), or a substance obtained by adding neodymium (Nd) (transition metal substance) as the light emission center to a base material of $Ca_3Al_2O_6$ (aluminic acid salt). More specifically, the stress light-emitting material is prepared by adding 0.6 wt % Eu to serve as the light emission center and 1 wt % boric acid as the flux to $Sr_3Al_2O_6$ as the base material, followed being sintered for about 4 hours at 1300° C. in a reducing atmosphere (Ar+$H_2$5%). The stress light-emitting material can be utilized by preparing a powder of the obtained product.

Other than the above, those usable as the stress light-emitting material include $Sr_{0.90}Al_2O_{3.90}$:$EU_{0.01}$ (see Japanese Patent Application Laid-open No. 2000-63824), $Ca_2Al_2SiO_7$:Ce, $Ca_2MgSi_2O_7$:Ce (see Japanese Patent Application Laid-open No. 2001-49251), and $ZnAl_2O_4$:Mn, $BaAl_2O_4$:Ce (see Japanese Patent Application Laid-open No. 2001-64638).

As shown in FIG. 2A, when the stress light-emitting section 27 is provided at the inner portion of the bent section 21c of the contact section 21, then the powder of the stress light-emitting material and an adhesive such as those based on the epoxy having the light-transmissive property are mixed with each other to prepare a paste, and the paste is applied to the inner portion of the bent section 21c of the contact section 21 to provide a predetermined thickness. In this way, the first stress light-emitting section 27 is provided at the inner portion of the bent section 21c of the contact section 21. Of course, the inner portion of the bent section 21c itself may be a part of the first stress light-emitting section 27. That is, the inner portion of the bent section 21c can be formed of the stress light-emitting material.

Next, an explanation will be made with reference to FIGS. 2A and 2B about the ink supply port 22, the fixing mechanism (engaging mechanism, fastening mechanism) 23, and the disengaging mechanism 25 provided with the first ink cartridge 14 and the first cartridge-installing section 13 respectively. The ink supply port 22, the fixing mechanism 23, and the disengaging mechanism 25 are provided with each of the second to fourth ink cartridges 14 and the second to fourth cartridge-installing sections 13. However, they are equivalent to those provided for the first ink cartridge 14 and the first cartridge-installing sections 13, any explanation of which will be omitted.

As shown in FIG. 2A, the ink supply port 22 is provided at the lower portion of the back wall section 14a of the first ink cartridge 14. The ink supply port 22 is closed, for example, by a plate-shaped valve plug 32 made of synthetic rubber from the inside. A packing 33 is attached to the outer surface of the inner circumferential edge portion for forming the ink supply port 22. A connecting tube 34, which has a needle-shaped forward end portion, is arranged at a position opposed to the ink supply port 22. The proximal end portion of the connecting tube 34 is connected to a connecting hole 35 provided at a lower portion of the back wall section 13a of the first cartridge-installing section 13. An ink supply tube 17 is connected to the connecting hole 35. Therefore, as shown in FIG. 2B, when the first ink cartridge 14 is installed to the first cartridge-installing section 13, then the forward end portion of the connecting tube 34 is inserted into the ink supply port 22, the valve plug 32 is forcibly opened, and thus the ink supply port 22 can be opened. Accordingly, the black ink 20, which is stored in the first ink cartridge 14, can be supplied to the head unit.

As shown in FIG. 2B, the fixing mechanism 23 is provided with a fixing pawl (fastening pawl) 36 and a fixing recess (fastening recess) 24. When the first ink cartridge 14 is installed to the first cartridge-installing section 13, the fixing mechanism 23 releasably fixes the first ink cartridge 14 at the installation position.

As shown in FIG. 2B, the fixing pawl 36 is provided on the lower surface of the upper wall section 13b of the first cartridge-installing section 13. The fixing pawl 36 extends in the detaching direction of the first ink cartridge 14. A projection 36a is formed on the lower surface of the forward end portion thereof. The fixing pawl 36 is arranged in an accommodating recess formed on the lower surface of the upper wall section 14b so that the forward end portion is movable in the upward-downward direction.

As shown in FIG. 2B, the fixing recess 24 is provided on the upper surface of the upper wall section 14b of the first ink cartridge 14. The fixing recess 24 is formed to have a size and a position so that the projection 36a of the fixing pawl 36 is engaged therewith when the first ink cartridge 14 is installed to the first cartridge-installing section 13.

As shown in FIG. 2B, the disengaging mechanism 25 is provided with a detaching lever 37 and a disengaging recess 26. The disengaging mechanism 25 detaches or takes out the first ink cartridge 14 which is installed to the first cartridge-installing section 13 and which is fixed by the fixing mechanism 23.

As shown in FIG. 2B, the detaching lever 37 is an L-shaped member. The detaching lever 37 is arranged in a slit portion formed at the corner of intersection between the front wall section 13f and the upper wall section 13b of the first cartridge-installing section 13. The detaching lever 37 is swingably attached to the upper wall section 13b by the aid of a pivot shaft 37a provided at one proximal end portion thereof.

As shown in FIG. 2B, the disengaging recess 26 is provided on the front side as compared with the fixing recess 24 (on the side in the detaching direction) on the upper surface of the upper wall section 14b of the first ink cartridge 14. The disengaging recess 26 is formed to have a size and a position so that the engaging end 37b, which is formed at the forward end portion disposed on the proximal end side of the detaching lever 37, is engaged therewith when the first ink cartridge 14 is installed to the first cartridge-installing section 13.

Next, an explanation will be made about the function of the fixing mechanism 23 and the disengaging mechanism 25 constructed as described above. At first, as shown in FIG. 2A, when the operator progressively installs the first ink cartridge 14 to the first cartridge-installing section 13, then the forward end portion of the contact section 21 is brought into contact with the inner surface of the back wall section 13a of the first cartridge-installing section 13, and the contact section 21 is elastically deformed. When the first ink cartridge 14 is further inserted into the back side, the contact section 21 is further elastically deformed.

Finally, as shown in FIG. 2B, when the first ink cartridge 14 is moved to the predetermined installation position, the projection 36a of the fixing pawl 36 of the fixing mechanism 23 is engaged with the fixing recess 24. In this situation, the contact section 21 is brought into contact with the inner surface of the back wall section 13a of the first cartridge-installing section 13, and the contact section 21 is elastically deformed. The contact section 21 pushes the first ink cartridge 14 in the detaching direction in which the first ink cartridge 14 is taken out or detached from the first cartridge-installing section 13. In this installation state, the engaging end 37b of the detaching lever 37 of the disengaging mechanism 25 is engaged with the disengaging recess 26.

Subsequently, when the first ink cartridge 14 is taken out from the first cartridge-installing section 13, the operator appropriately pushes the detaching lever 37 of the disengaging mechanism 25 upwardly. When the detaching lever 37 is pushed upwardly, the engaging end 37b of the detaching lever 37 can move the disengaging recess 26 in the detaching direction. Therefore, the first ink cartridge 14 can be moved in the direction in which the first ink cartridge 14 is detached or taken out from the first cartridge-installing section 13. Accordingly, the projection 36a of the fixing pawl 36 is disengaged or unfastened from the fixing recess 24. Therefore, the first ink cartridge 14 is automatically moved by the elastic force of the contact section 21 in the direction in which the first ink cartridge 14 is taken out from the first cartridge-installing section 13 to give the state (non-installed state) as shown, for example, in FIG. 2A. In this situation, the first ink cartridge 14 is in such a state that the first ink cartridge 14 slightly protrudes from the first cartridge-installing section 13. Therefore, the first ink cartridge 14 can be pinched by hand so that the first ink cartridge 14 can be easily taken out from the first cartridge-installing section 13.

The first cartridge-installing section 13 has the upper wall section 13b, the lower wall section 13c, and the two side wall sections 13d which are formed so that the first ink cartridge 14 can be installed and taken out along with the predetermined route. The upper wall section 13b, the lower wall section 13c, and the side wall sections 13d can guide the upper wall section 14b, the lower wall section 14c, and the respective side wall sections 14d of the first ink cartridge 14 in the attaching/detaching directions.

Second Embodiment

Figure 3:
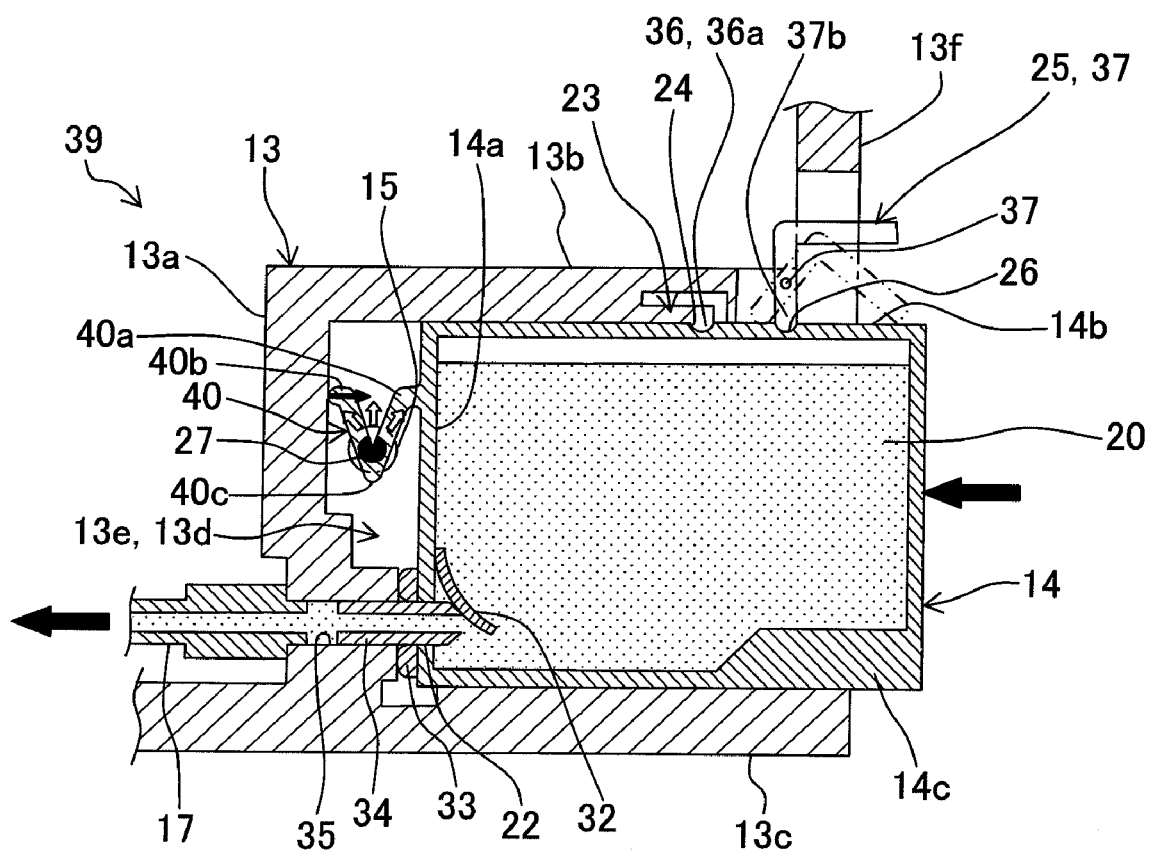
FIG. 3 shows a vertical sectional view illustrating an attachable member and a device for detecting the attachable member according to a second embodiment of the present invention.

Next, an explanation will be made with reference to FIG. 3 about a second embodiment of an attaching mechanism according to the present invention. A detecting device 39 for an attachable member and a contact section 40 of the attachable member of the attaching mechanism according to the second embodiment shown in FIG. 3 are different from the detecting device 11 for the attachable member and the contact section 21 of the attachable member according to the first embodiment shown in FIGS. 2A and 2B. However, the components or the parts other than the above are the same or equivalent. Therefore, the same or equivalent portions are designated by the same reference numerals in the drawing, any explanation of which will be omitted.

The contact section 40 shown in FIG. 3 is a V-shaped member which is bent in a substantially V-shaped form. A base section 40a thereof is joined to the upper portion of the outer surface of the back wall section 14a of the first ink cartridge 14, and a forward end section 40b thereof protrudes in the direction of installation of the first ink cartridge 14. The contact section 40, which has the substantially V-shaped form, is arranged in parallel to the side wall section 14d of the first ink cartridge 14, and a bent section 40c thereof protrudes downwardly.

As shown in FIG. 3, the contact section 40 has the V-shaped structure of being bent in the substantially V-shaped form. Therefore, the contact section 40 realizes the deformation-enhancing structure which is greatly deformed when the pressing force is applied to the forward end section 40b. Further, the stress, which is generated in the contact section 40 by the deformation, is concentrated on the inner portion of the bent section 40c (stress-concentrating section) at which the first stress light-emitting section 27 is provided. In this way, the contact section 40 is bent in the substantially V-shaped form, and the first stress light-emitting section 27 is formed at the inner portion of the bent section 40c on which the stress is concentrated. Therefore, the stress, which has the magnitude required for the first stress light-emitting section 27, can be applied to the first stress light-emitting section 27 when the first ink cartridge 14 is installed to the first cartridge-installing section 13 in the same manner as in the first embodiment. As a result, it is possible to emit the light at a required light emission intensity (luminance).

Third Embodiment

Figure 4:
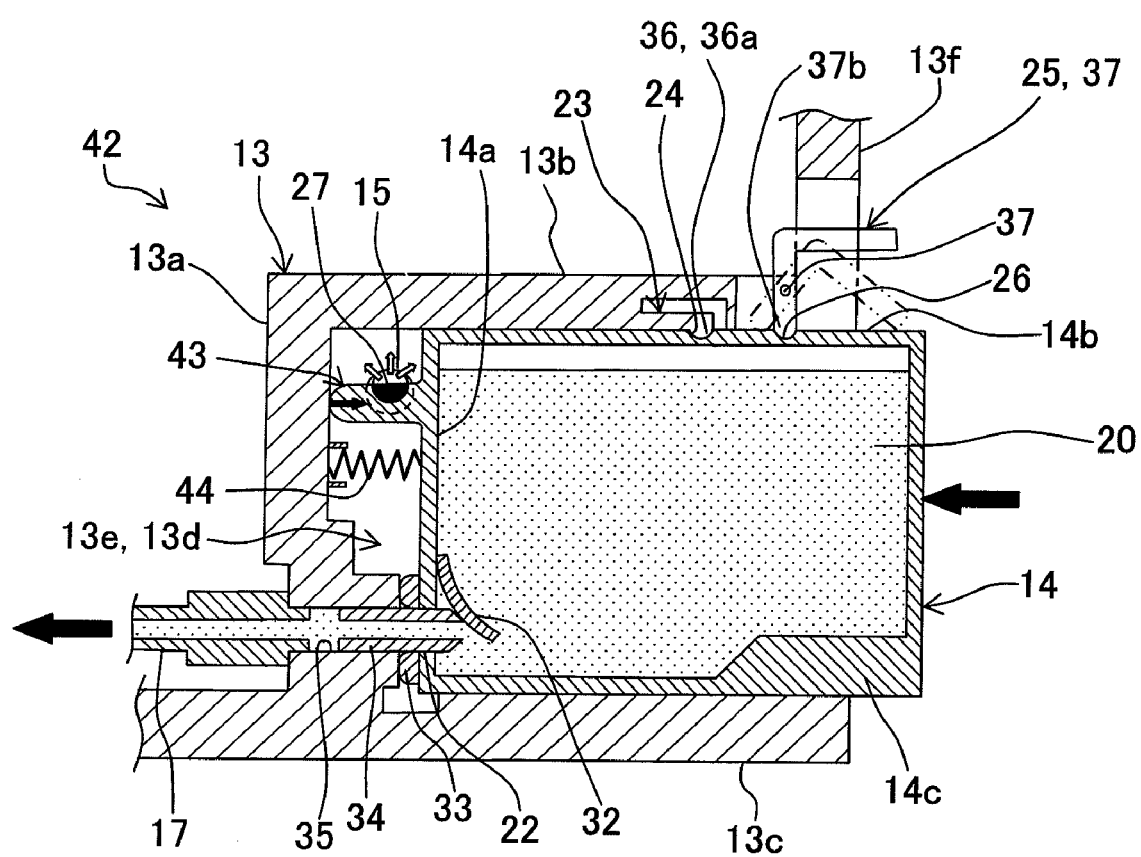
FIG. 4 shows a vertical sectional view illustrating an attachable member and a device for detecting the attachable member according to a third embodiment of the present invention.

Next, an explanation will be made with reference to FIG. 4 about a third embodiment of an attaching mechanism according to the present invention. A detecting device 42 for an attachable member and an contact section 43 of the attachable member of the attaching mechanism according to the third embodiment shown in FIG. 4 are different from the detecting device 11 for the attachable member and the contact section 21 of the attachable member according to the first embodiment shown in FIGS. 2A and 2B. However, the components or the parts other than the above are the same as or equivalent to those of the first embodiment shown in FIGS. 2A and 2B. Therefore, the same or equivalent portions are designated by the same reference numerals in the drawing, any explanation of which will be omitted. In the third embodiment shown in FIG. 4, a detaching spring 44 is provided, which pushes the first ink cartridge 14 installed to the first cartridge-installing section 13 in the direction to detach or take out the first ink cartridge 14 from the first cartridge-installing section 13.

The contact section 43 shown in FIG. 4 is a slender plate-shaped projection. A proximal end portion thereof is joined to the upper portion of the outer surface of the back wall section 14a of the first ink cartridge 14, and a forward end portion thereof protrudes in the direction of installation of the first ink cartridge 14 (in the horizontal left direction as viewed in FIG. 4). The contact section 43 is provided to extend in a direction parallel to the installation direction. The contact section 43 realizes the deformation-enhancing structure by the slender plate-shaped projection. The first stress light-emitting section 27 is provided at a central portion of the upper edge portion of the contact section 43.

In the case of the contact section 43 shown in FIG. 4, when the forward end of the contact section 43 is brought into contact with the inner surface of the back wall section 13a of the first cartridge-installing section 13, the force is applied in the direction to compress the contact section in the extending direction of the contact section 43. In this way, when the contact section 43 is formed so that the force in the compressing direction is applied to the contact section 43, the projection area, which is obtained when the contact section 43 is viewed in the direction of installation of the first ink cartridge 14, can be decreased, as compared with the case in which the force in the bending direction is applied to the contact section 21 as in the first embodiment shown in FIG. 2B. Accordingly, it is possible to widen the degree of freedom of the attachment position of the contact section 43 with respect to the first ink cartridge 14. As shown in FIG. 4, the detaching spring 44 is attached to the inner surface of the back wall section 13a of the first cartridge-installing section 13. When the fixing pawl 36 is disengaged from the first ink cartridge 14, then the first ink cartridge 14 is automatically urged in the detaching direction, and the first ink cartridge 14 can be moved to the position at which the operator can detach or take out the first ink cartridge 14 with ease.

Fourth Embodiment

Figure 5A:
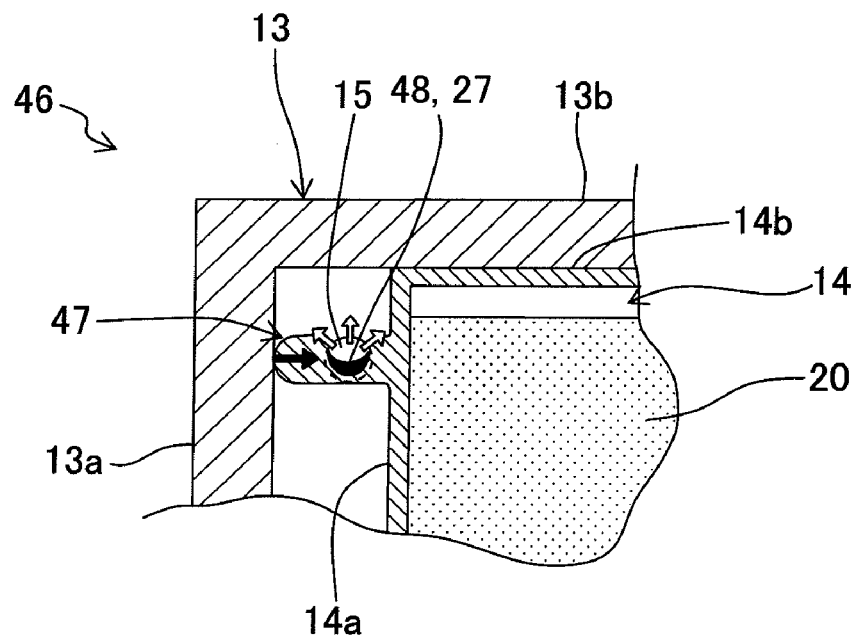
FIG. 5A shows a vertical sectional view illustrating an contact section of an attachable member and a device for detecting the attachable member according to a fourth embodiment of the present invention.

Next, an explanation will be made with reference to FIG. 5A about a fourth embodiment of an attaching mechanism according to the present invention. A detecting device 46 for an attachable member and the attachable member of the attaching mechanism according to the fourth embodiment shown in FIG. 5A are different from the detecting device 42 for the attachable member and the attachable member of the attaching mechanism according to the third embodiment shown in FIG. 4 in the following points. In the case of the contact section 43 of the third embodiment shown in FIG. 4, the upper edge portion thereof is formed to have the horizontal straight line form, and the first stress light-emitting section 27 is provided at the horizontal straight line-shaped upper edge portion. On the contrary, in the case of an contact section 47 of the fourth embodiment shown in FIG. 5A, an upper edge thereof is formed to have a horizontal straight line form, and a substantially semicircular cutout 48 is provided at the horizontal straight line-shaped upper edge. The first stress light-emitting section 27 is provided at an inner edge portion of the cutout 48. The components or the parts other than the above are the same as or equivalent to those of the third embodiment shown in FIG. 4. Therefore, the same or equivalent portions are designated by the same reference numerals in the drawing, any explanation of which will be omitted.

As shown in FIG. 5A, the contact section 47 is formed as a slender plate-shaped projection, and the contact section 47 is arranged to protrude in the horizontal direction. The cutout 48 is formed at the upper edge portion thereof. The inner edge portion of the cutout 48 has a small wall thickness in the cutout direction of the contact section 47. The inner edge portion of the cutout 48 is formed as a thin-walled portion and as a low rigidity portion as well. In other words, the inner edge portion of the cutout 48 is formed as the deformation-enhancing structure which is greatly deformable by the external force. Further, the first stress light-emitting section 27 is provided at the inner edge portion on which the stress generated in the contact section 47 by the external force is concentrated. Therefore, when the first ink cartridge 14 is installed to the first cartridge-installing section 13, the stress, which has a required magnitude for the first stress light-emitting section 27, can be applied to the first stress light-emitting section 27 in the same manner as in the first embodiment. As a result, it is possible to emit the light at a required light emission intensity (luminance).

Fifth Embodiment

Figure 5B:
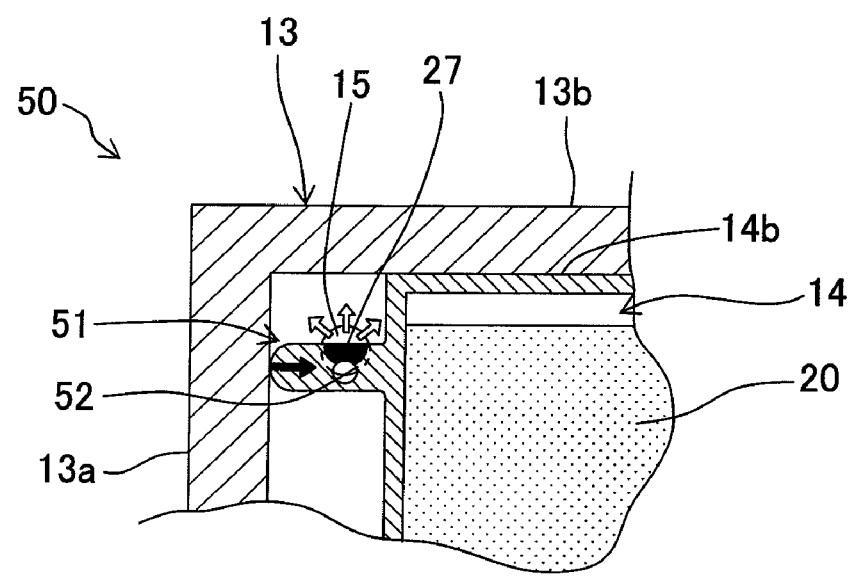
FIG. 5B shows a vertical sectional view illustrating an contact section of an attachable member and a device for detecting the attachable member according to a fifth embodiment of the present invention.

Next, an explanation will be made with reference to FIG. 5B about a fifth embodiment of an attaching mechanism according to the present invention. A detecting device 50 for an attachable member and the attachable member of the attaching mechanism according to the fifth embodiment shown in FIG. 5B are different from the detecting device 46 for the attachable member and the attachable member of the attaching mechanism according to the fourth embodiment shown in FIG. 5A in the following points. In the case of the contact section 47 of the fourth embodiment shown in FIG. 5A, the substantially semicircular cutout 48 is formed at the upper edge portion, and the first stress light-emitting section 27 is provided at the inner edge portion of the cutout 48. On the contrary, in the case of an contact section 51 of the fifth embodiment shown in FIG. 5B, a circular hole 52 is formed at a central portion of the contact section 51. The first stress light-emitting section 27 is provided at an upper edge portion of the contact section 51 at a position disposed over or above the position at which the hole 52 is provided.

The components or the parts other than the above are the same as or equivalent to those of the fourth embodiment shown in FIG. 5A. Therefore, the same or equivalent portions are designated by the same reference numerals in the drawing, any explanation of which will be omitted. Further, the contact section 51 of the fifth embodiment functions in the same manner as the contact section 47 of the fourth embodiment, any explanation of which is omitted.

Sixth Embodiment

Figure 6:
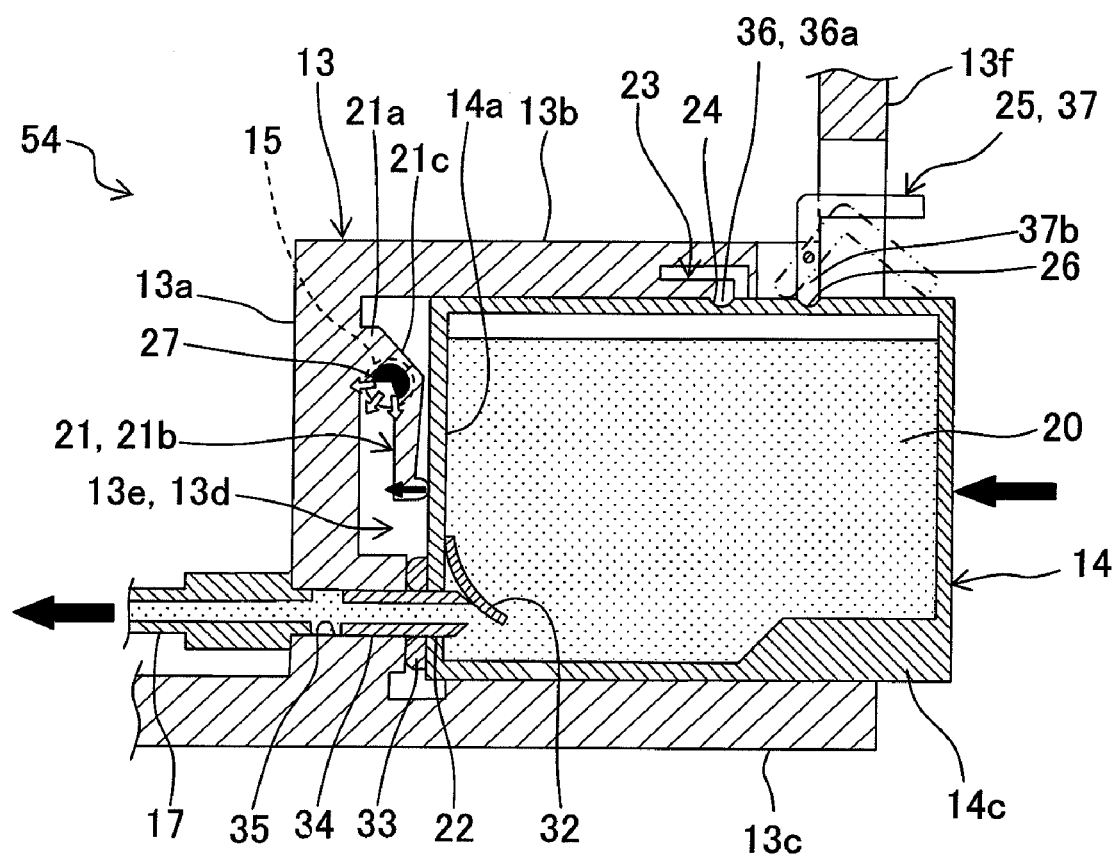
FIG. 6 shows a vertical sectional view illustrating an attachable member and a device for detecting the attachable member according to a sixth embodiment of the present invention.

Next, an explanation will be made with reference to FIG. 6 about a sixth embodiment of an attaching mechanism according to the present invention. A detecting device 54 for an attachable member and the attachable member of the attaching mechanism according to the sixth embodiment shown in FIG. 6 are different from the detecting device 11 for the attachable member and the attachable member of the attaching mechanism according to the first embodiment shown in FIGS. 2A and 2B in the following points. The contact section 21 of the first embodiment shown in FIGS. 2A and 2B is provided for the first ink cartridge 14, while an contact section 21 of the sixth embodiment shown in FIG. 6 is provided for a first cartridge-installing section 13.

The components or the parts other than the above are the same as or equivalent to those of the first embodiment shown in FIGS. 2A and 2B. Therefore, the same or equivalent portions are designated by the same reference numerals in the drawing, any explanation of which will be omitted. Further, the contact section 21 of the sixth embodiment functions in the same manner as the contact section 21 of the first embodiment, any explanation of which is omitted.

Seventh Embodiment

Figure 7:
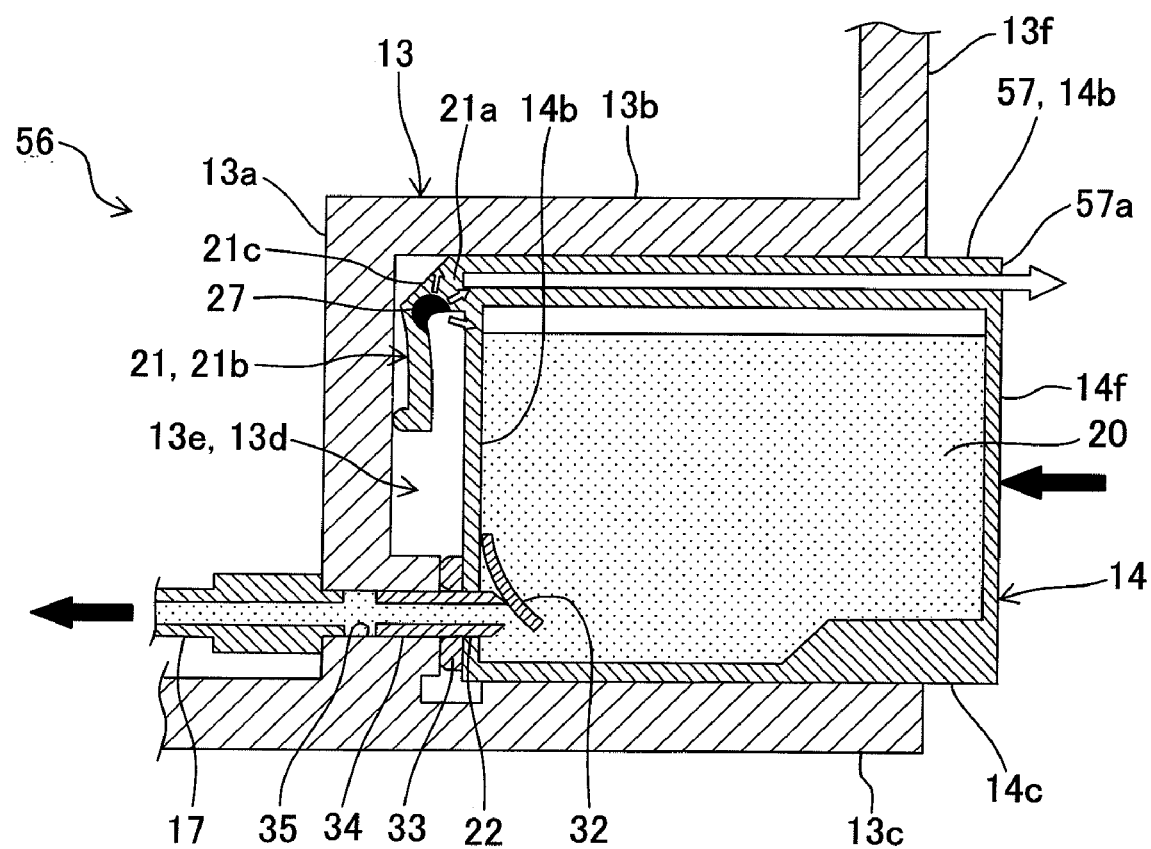
FIG. 7 shows a vertical sectional view illustrating an attachable member and a device for detecting the attachable member according to a seventh embodiment of the present invention.

Next, an explanation will be made with reference to FIG. 7 about a seventh embodiment of an attaching mechanism according to the present invention. The attaching mechanism according to the seventh embodiment shown in FIG. 7 is different from the attaching mechanism according to the first embodiment shown in FIGS. 2A and 2B in the following points. In the case of the first embodiment shown in FIGS. 2A and 2B, the attaching mechanism has the detecting device 11 for the attachable member. The light, which is emitted from each of the first to fourth stress light-emitting sections 27, is received by each of the first to fourth light-receiving sensors 15, and the degree of the magnitude of the pushing force, which is brought about when each of the first to fourth ink cartridges 14 is installed, is displayed on each of the first to fourth display sections 16. On the contrary, in the case of the seventh embodiment shown in FIG. 7, the first to fourth light-receiving sensors 15 and the first to fourth display sections 16 are not provided. The attaching mechanism according to this embodiment has a display device 56 for the attachable member for displaying the light at the outside by means of an optical guide section 57 as described later on, in place of the detecting device 11 for the attachable member. Each of the first to fourth contact sections 21 is formed of a light-transmissive material. The light, which is emitted from each of the first to fourth stress light-emitting sections 27, is guided by the optical guide section 57 which is provided for each of the first to fourth ink cartridges 14. The light is allowed to outgo from a display end section 57a arranged on the side of the front wall section 14f of each of the first to fourth ink cartridges 4.

The components or the parts other than the above are the same as or equivalent to those of the first embodiment shown in FIGS. 2A and 2B. Therefore, the same or equivalent portions are designated by the same reference numerals in the drawing, any explanation of which will be omitted. Although the fixing mechanism 23 and the disengaging mechanism 25 are omitted in FIG. 7, these components are also provided.

As shown in FIG. 7, the optical guide section 57, which is provided for each of the first to fourth ink cartridges 14, is provided by forming the upper wall section 14b of a light-transmissive synthetic resin. The proximal end section 21a of the contact section 21 is joined to the end of the optical guide section 57 disposed on the back side, and the display end section 57a of the optical guide section 57, which is disposed on the front side, is exposed to the outside. The contact section 21 is formed of a light-transmissive material.

In the case of the arrangement constructed as described above, the stress light-emitting section 27 emits the light when the ink cartridge 14 is installed to the cartridge-installing section 13. The light can be guided by the optical guide section 57, and the display end section 57a of the optical guide section 57, which is disposed on the side of the front wall section 14d, can be turned on. Therefore, the light of the stress light-emitting section 27 can be guided to the outer portion which can be easily viewed by the operator, without using the light-receiving sensor 15, the electric wiring, and the power source. Further, the stress light-emitting section 27 can be provided at the portion which cannot be viewed from the outside of the ink-jet printer 12 and the ink cartridge 14. Therefore, it is possible to improve the appearance.

The optical guide section 57 is formed at the upper wall section 14b which is a part of the ink cartridge 14. Accordingly, the structure is simple and relatively not bulky. It is possible to reduce the cost. It is not necessarily indispensable that the optical guide section 57 is provided at the upper wall section 14b of the ink cartridge 14. An optical guide section may be formed of, for example, an optical fiber, and the optical guide section may be attached to the upper surface of the upper wall section 14b.

FIG. 7 illustrates the exemplary case in which the optical guide section 57 is provided for the ink cartridge 14. In place thereof, an optical guide member such as an optical fiber may be provided for the main body portion of the ink-jet printer 12, and the optical fiber may be used so that the light, which is emitted from the stress light-emitting section 27, is allowed to outgo from the outer surface of the main body portion of the ink-jet printer 12. For example, one end of the optical fiber may be arranged at the position of each of the first to fourth light-receiving sensors 15 shown in FIG. 2B, and the other end of the optical fiber may be arranged at the position of each of the first to fourth display sections 16.

Eighth Embodiment

Figure 8:
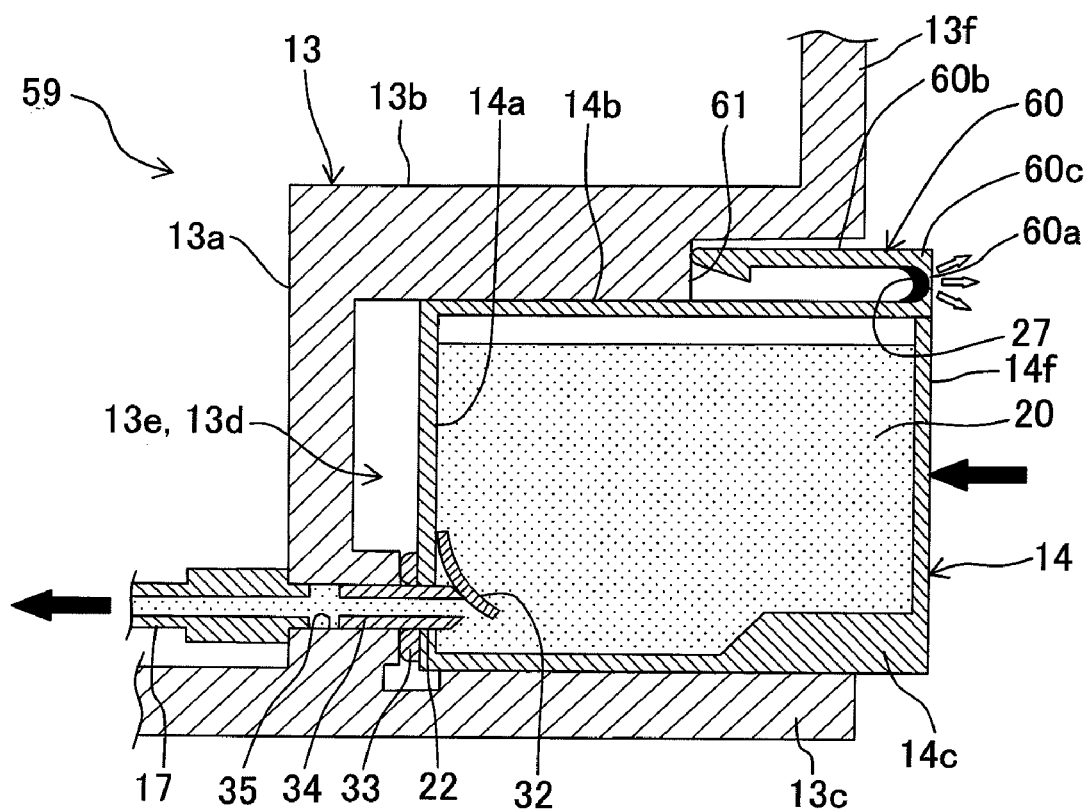
FIG. 8 shows a vertical sectional view illustrating an attachable member and a device for detecting the attachable member according to an eighth embodiment of the present invention.

Next, an explanation will be made with reference to FIG. 8 about an attaching mechanism according to an eighth embodiment. A display device 59 for an attachable member and the attachable member of the attaching mechanism according to the eighth embodiment shown in FIG. 8 are different from the display device 56 for the attachable member and the attachable member of the attaching mechanism according to the seventh embodiment shown in FIG. 7 in the following points. In the seventh embodiment shown in FIG. 7, the light, which is emitted from each of the first to fourth stress light-emitting sections 27, is guided by the optical guide section 57 provided for each of the first to fourth ink cartridges 14, and the light is allowed to outgo from the display end section 57a disposed on the side of the front wall section 14f of each of the first to fourth ink cartridges 14. On the contrary, in the eighth embodiment shown in FIG. 8, the optical guide section is not used. In other words, the light, which is emitted from each of first to fourth stress light-emitting sections 27, is allowed to directly outgo from each of the first to fourth stress light-emitting sections 27 of an on-contact section 60 provided at the upper end of the front wall section 14f of each of the first to fourth ink cartridges 14.

The components or the parts other than the above are the same as or equivalent to those of the seventh embodiment shown in FIG. 7. Therefore, the same or equivalent portions are designated by the same reference numerals in the drawing, any explanation of which will be omitted. Although the fixing mechanism 23, the disengaging mechanism 25, and the detaching spring 44 are omitted from FIG. 8, these components are also provided.

As shown in FIG. 8, the first stress light-emitting section 27, which is provided for each of the first to fourth ink cartridges 14 of this embodiment, is provided at the contact section 60 which is coupled to the upper end of the front wall section 13f.

The contact section 60 is a member which is bent in a substantially L-shaped form. The contact section 60 is provided with a proximal end section 60a and a forward end section 60b. The proximal end section 60a is joined to the upper end portion of the front wall section 14f of the first ink cartridge 14. The forward end section 60b of the contact section 60 extends horizontally from the proximal end section 60a by a predetermined length toward the left side as shown in FIG. 8. Further, the forward end section 60b of the contact section 60 is arranged in parallel to the upper wall section 14b while allowing a spacing distance intervening therebetween. As shown in FIG. 8, the first stress light-emitting section 27 is provided at a bent section 60c (stress-concentrating section) of the substantially L-shaped contact section 60 and at an inner portion of the proximal end section 60a. The bent section 60c and the proximal end section 60a are exposed to the outside in a state in which the first ink cartridge 14 is installed. The contact section 60 is formed of a light-transmissive material.

In the arrangement constructed as described above, when the ink cartridge 14 is installed to the cartridge-installing section 13, then the forward end of the contact section 60 makes a contact with a fixing end surface 61 of a step formed on the upper wall section 13b of the cartridge-installing section 13, and the stress light-emitting section 27 emits the light. The light is visually recognized by the operator directly. Therefore, it is unnecessary to provide the optical guide section 57, and it is possible to simplify the structure.

Ninth Embodiment

Next, an explanation will be made with reference to FIGS. 1, 9, and 10 about an attaching mechanism according to a ninth embodiment of the present invention. A detecting device 63 for an attachable member and the attachable member of the attaching mechanism according to the ninth embodiment shown in FIGS. 1, 9, and 10 are different from the detecting device 11 for the attachable member and the attachable member of the attaching mechanism according to the first embodiment shown in FIGS. 1, 2A, and 2B in the following points. In the first embodiment shown in FIGS. 1, 2A, and 2B, the present invention is applied to the first to fourth ink cartridges 14 and the first to fourth cartridge-installing sections 13 of the ink-jet printer 12. On the contrary, in the ninth embodiment shown in FIGS. 1, 9, and 10, the present invention is applied to a printing paper tray (paper feed tray) 19 and a tray-installing section 64 of the ink-jet printer 12.

As shown in FIGS. 9A to 9D, the printing paper tray 19 of this embodiment is a dish-shaped member having a rectangular shape in a plan view. A rectangular cutout 65 is formed at back portions of a back wall section 19a and a bottom wall section 19c. An contact section 66 is provided to protrude at the bottom edge portion of the cutout 65.

The contact section 66 is a slender plate-shaped member having a rectangular shape. The contact section 60 is formed in the same plane as that of the bottom wall section 19c. The contact section 66 is formed to have a predetermined length so that the contact section 66 extends in the direction of installation of the printing paper tray 19. A fifth stress light-emitting section 27 is provided on the lower surface disposed on the side of the proximal end portion of the contact section 66. The light, which is emitted by the fifth stress light-emitting section 27, is received by the fifth light-receiving sensor 30.

Figure 10A:
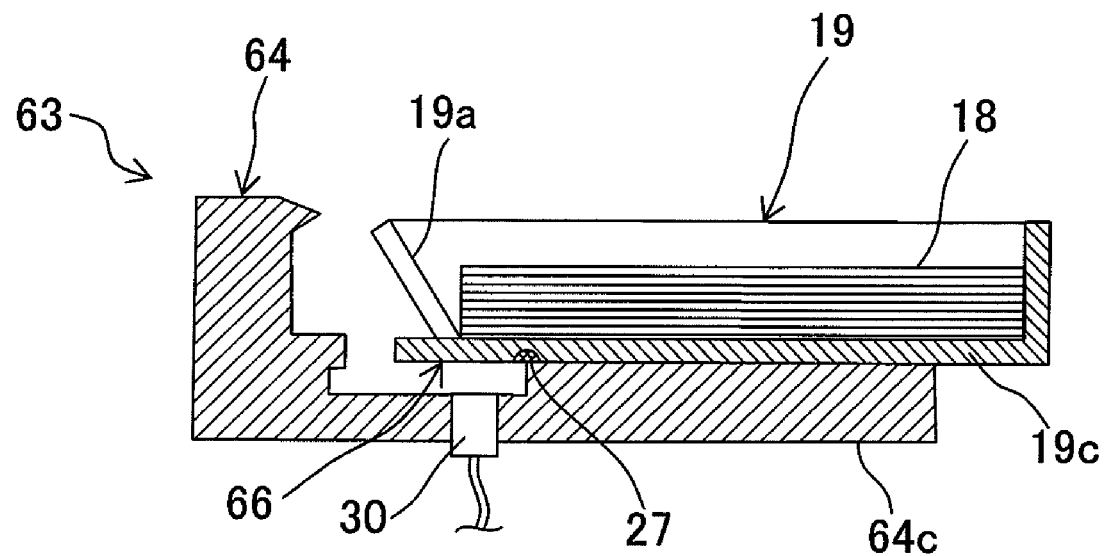
Figure 10B:
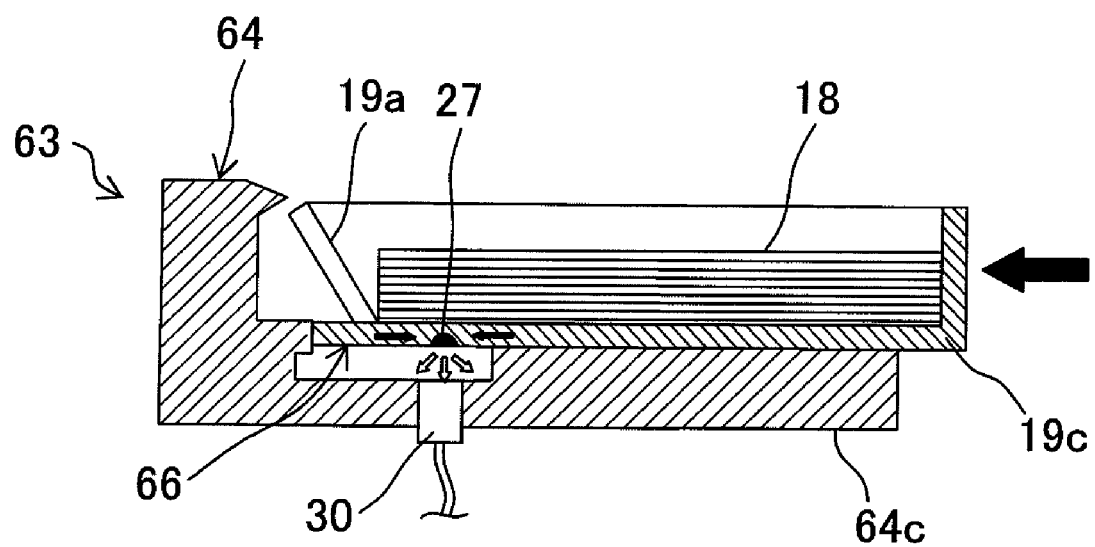

The fifth light-receiving sensor 30 receives the light emitted by the fifth stress light-emitting section 27 to generate a detection signal corresponding to the light emission intensity of the light. As shown in FIG. 10B, the fifth light-receiving sensor 30 is provided at the bottom wall section 64c of the tray-installing section 64 at the position at which the fifth light-receiving sensor 30 can receive the light emitted by the fifth stress light-emitting section 27 provided for the contact section 66 when the printing paper tray 19 is installed to the tray-installing section 64. The fifth light-receiving sensor 30 is electrically connected to the control unit 28 provided for the ink-jet printer 12 in the same manner as in the first embodiment.

As shown in FIG. 11, the fifth light-receiving sensor 30 and the fifth display section 31 are electrically connected to the control unit 28 in addition to the first to fourth light-receiving sensors 15 and the first to fourth display sections 16. The control unit 28 is provided with the judging section. The judging section judges, for example, whether or not the force, which is exerted when each of the first to fourth ink cartridges 14 is installed to each of the first to fourth cartridge-installing sections 13 corresponding thereto, is appropriate in the same manner as in the first embodiment. A predetermined indication can be displayed on each of the first to fourth display sections 16 on the basis of an obtained result of the judgment. Further, the judging section judges, for example, whether or not the force, which is exerted when the printing paper tray 19 is installed to the tray-installing section 64, is appropriate. A predetermined indication can be displayed on the fifth display section 31 on the basis of an obtained result of the judgment. Any further explanation thereof is omitted herein.

Figure 9A:
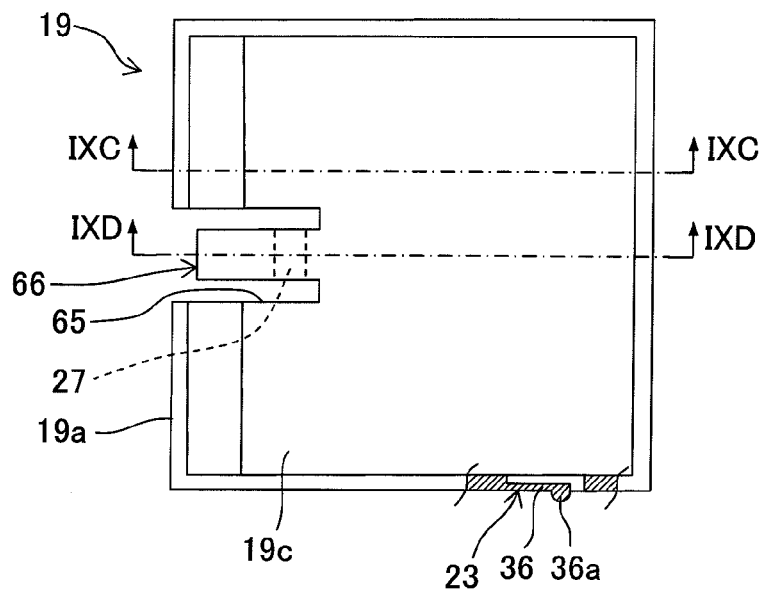
Figure 9B:
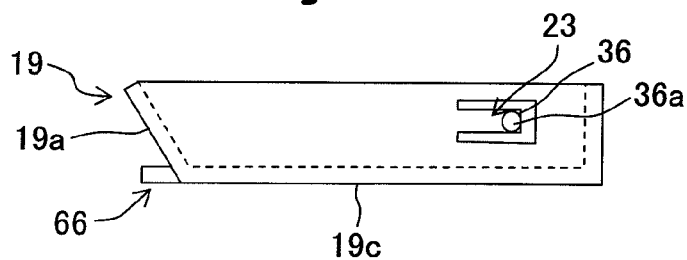
Figure 9C:
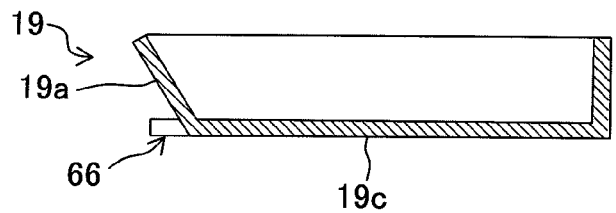
Figure 9D:
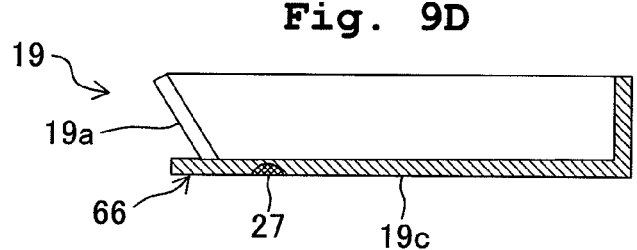

As shown in FIGS. 9A and 9B, the fixing mechanism 23, which is provided for the ink cartridge 14 and the cartridge-installing section 13 of the first embodiment, is provided for the printing paper tray 19 and the tray-installing section 64.

The respective embodiments described above are illustrative of the exemplary case in which the present invention is applied to the ink cartridge 14 and the cartridge-installing section 13 as well as the printing paper tray 19 and the tray-installing section 64 of the ink-jet printer 12. However, other than the above, the present invention is applicable, for example, to ink cartridges 14 and cartridge-installing sections 13 as well as printing paper trays 19 and tray-installing sections 64 of, for example, copying machines and facsimile. When the present invention is applied to the printing paper tray and the tray-installing section, the present invention is applicable, for example, to any printer which performs the printing based on any arbitrary system, without being limited to the printer, the copying machine, and the facsimile based on the ink-jet system to perform the printing by jetting ink droplets. Further, the present invention is applicable, for example, to cameras and mobile phones as attachable members and battery chargers, as the installing section, to which the cameras and the mobile phones are detachably installed. Alternatively, the present invention is also applicable to an attaching mechanism for a memory element including the memory element such as an SD memory card and a memory-installing section for detachably installing the memory element, as well as an attaching mechanism for a secondary battery including the rechargeable secondary battery and a battery charger for detachably installing the secondary battery. Still alternatively, the present invention is also applicable to an attaching mechanism for a fuel cell system including a fuel cell and an installing unit of the fuel cell to which the fuel cell is installed.

The respective embodiments described above are constructed such that the pushing force, which is exerted when the ink cartridge 14 or the like is installed to the cartridge-installing section 13 or the like, is detected to make the display, for example, on each of the display sections 16. However, in addition thereto, it is possible to provide the following arrangement. That is, the detaching force, which is exerted when the ink cartridge 14 or the like is detached or removed from the cartridge-installing section 13 or the like, is detected to make the display on each of the display sections 16.

As described above, the attaching mechanism according to the present invention has the simple structure, which makes it possible to detect or display whether or not the attachable member such as the ink cartridge or the printing paper tray is appropriately installed to the installing section. Further, an excellent effect is provided such that it is possible to detect or display the degree of the magnitude or strength of the installing force at which the attachable member is installed to the installing section. The attaching mechanism according to the present invention is appropriate to be applied to the detecting device (display device) for the attachable member and the attachable member as described above.

What is claimed is:

1. An attaching mechanism comprising:
   an attachable member;
   an installing section to which the attachable member is detachably installed;
   a contact section which is provided on one of the installing section and the attachable member and which is brought into contact with the other of the installing section and the attachable member when the attachable member is installed to the installing section; and
   a stress light-emitting section which is provided on the contact section and which emits a light by receiving a force applied to the contact section when the contact section is brought into contact with the other of the installing section and the attachable member.

2. The attaching mechanism according to claim 1, further comprising a light-receiving sensor which receives the light emitted by the stress light-emitting section and which generates a detection signal to indicate detection that the attachable member is installed to the installing section.

3. The attaching mechanism according to claim 1, further comprising an optical guide member which guides the light emitted by the stress light-emitting section to an outer portion of the attachable member installed to the installing section, the outer portion being exposed to outside of the attaching mechanism, or to an outer portion of the installing section exposed to the outside of the attaching mechanism.

4. The attaching mechanism according to claim 1, wherein the stress light-emitting section is arranged at an outer portion of the attachable member installed to the installing section, the outer portion being exposed to outside of the attaching mechanism, or at an outer portion of the installing section exposed to the outside of the attaching mechanism.

5. The attaching mechanism according to claim 1, wherein the contact section includes a deformable portion which is deformable depending on a magnitude of the force, and the stress light-emitting section is provided at the deformable portion.

6. The attaching mechanism according to claim 5, wherein the deformable portion has a structure selected from the group consisting of a bent structure, a projection, a thin-walled section, and a low rigidity section.

7. The attaching mechanism according to claim 5, wherein a cross section of the attachable member taken along a plane perpendicular to an installing direction in which the attachable member is installed to the installing section, is elongated in one direction; a cross section, of an installation hole taken along the perpendicular plane, is elongated in the one direction, the installation hole being formed in the installing section to which the attachable member is installed,
   the deformable portion has an extending portion extending in the one direction and a bent portion which is provided at one end of the extending portion and which is bend in a direction different from the one direction, and
   the stress light-emitting section is provided at the bent portion.

8. The attaching mechanism according to claim 1, wherein the contact section is formed such that the force is applied in a direction to compress the contact section when the contact section is brought into contact with the other of the installing section and the attachable member.

9. The attaching mechanism according to claim 1, wherein a light emission intensity of the light emitted by the stress light-emitting section is changed depending on a velocity of change of a stress generated in the stress light-emitting section resulting from the force.

10. The attaching mechanism according to claim 9, further comprising a light-receiving sensor which receives the light emitted by the stress light-emitting section and which generates a signal corresponding to the light emission intensity of the light; and
    a judging mechanism which judges whether or not the detection signal generated by the light-receiving sensor is greater than a predetermined first threshold value.

11. The attaching mechanism according to claim 10, wherein the judging mechanism judges whether or not the detection signal generated by the light-receiving sensor is greater than the first threshold value and whether or not the detection signal generated by the light-receiving sensor is greater than a predetermined second threshold value which is greater than the first threshold value.

12. The attaching mechanism according to claim 1, wherein the contact section is formed elastically deformably, and includes a fixing mechanism which releasably fixes the attachable member to the installing section at a predetermined position, of the installing section, at which the contact section is elastically deformed and at which the contact section is brought into contact with the installing section or the attachable member.

13. The attaching mechanism according to claim 1, wherein the attachable member is one of an ink cartridge and a printing paper tray.

14. A printer comprising the attaching mechanism as defined in claim 1.

15. An attachable member which is detachably installed to a predetermined installing section, the attachable member comprising:
    a body having a contact section which is brought into contact with the installing section when the attachable member is installed to the installing section, and a stress light-emitting section which is provided with the contact section and which emits a light by receiving a force applied to the contact section when the contact section is brought into contact with the installing section.

16. The attachable member according to claim 15, further comprising an optical guide member which guides the light emitted by the stress light-emitting section to an outer portion exposed to outside of the attachable member installed to the installing section.

17. The attachable member according to claim 16, wherein the optical guide member is formed integrally with the body.

* * * * *